(12) United States Patent
Carroll et al.

(10) Patent No.: US 7,503,944 B2
(45) Date of Patent: Mar. 17, 2009

(54) METHOD AND COMPOSITION FOR IMPROVING FUEL COMBUSTION

(76) Inventors: Robert W. Carroll, 128 Sawpit La., Bradbury, CA (US) 91010; Noel Carroll, 98 Mount Street, Suite 2, London W1K 2TE (GB); William F. Carroll, 135 Circle Dr., Bradbury, CA (US) 91010; Michael Carroll, 135 Circle Dr., Bradbury, CA (US) 91010

( * ) Notice: Subject to any disclaimer, the term of this patent is extended or adjusted under 35 U.S.C. 154(b) by 0 days.

(21) Appl. No.: 10/494,907

(22) PCT Filed: Nov. 8, 2002

(86) PCT No.: PCT/AU02/01519

§ 371 (c)(1), (2), (4) Date: Nov. 29, 2004

(87) PCT Pub. No.: WO03/040269

PCT Pub. Date: May 15, 2003

(65) Prior Publication Data

US 2005/0081430 A1    Apr. 21, 2005

(30) Foreign Application Priority Data

Nov. 9, 2001  (GB) .................... 0126990.1

(51) Int. Cl.
*C10L 1/12* (2006.01)
*C10L 1/18* (2006.01)
*C10L 1/24* (2006.01)
*C10L 1/22* (2006.01)

(52) U.S. Cl. .............. 44/354; 44/355; 44/362; 44/363; 44/364; 44/365; 44/366; 44/367; 44/457; 431/4

(58) Field of Classification Search .......... 44/354, 44/355–368, 457; 431/4
See application file for complete search history.

(56) References Cited

U.S. PATENT DOCUMENTS

| | | | |
|---|---|---|---|
| 2,086,775 A | 7/1937 | Lyons et al. | |
| 2,151,432 A | 3/1939 | Lyons et al. | |
| 2,402,427 A | 6/1946 | Miller et al. | |
| 2,460,700 A | 2/1949 | Lyons | |
| 3,365,499 A | 1/1968 | Clement et al. | |
| 4,048,098 A | 9/1977 | Koberstein et al. | |
| 4,110,251 A | 8/1978 | Lauder et al. | |
| 4,129,421 A * | 12/1978 | Webb | 44/354 |
| 4,153,579 A | 5/1979 | Summers et al. | |
| 4,170,573 A | 10/1979 | Ernest et al. | |
| 4,171,288 A | 10/1979 | Keith et al. | |
| 4,279,230 A | 7/1981 | Bauer et al. | |
| 4,304,678 A | 12/1981 | Schick et al. | |
| 4,500,439 A | 2/1985 | West et al. | |
| 4,622,308 A | 11/1986 | Koikeda et al. | |
| 4,629,472 A | 12/1986 | Hane, III et al. | |
| 4,728,340 A | 3/1988 | Vos | |
| 4,752,302 A | 6/1988 | Bowers et al. | |
| 4,882,994 A | 11/1989 | Veltman et al. | |
| 4,891,050 A | 1/1990 | Bowers et al. | |
| 4,892,562 A | 1/1990 | Bowers et al. | |
| 4,973,336 A | 11/1990 | Gheysens | |
| 4,985,160 A | 1/1991 | Henry et al. | |
| 5,034,020 A | 7/1991 | Epperly et al. | |
| 5,057,122 A | 10/1991 | Blain et al. | |
| 5,080,690 A | 1/1992 | Baillargeon et al. | |
| 5,182,037 A | 1/1993 | Pislet et al. | |
| 5,215,652 A | 6/1993 | Epperly et al. | |
| 5,232,464 A | 8/1993 | Kiezl | |
| 5,266,083 A * | 11/1993 | Peter-Hoblyn et al. | 44/358 |
| 5,324,334 A | 6/1994 | Brois et al. | |
| 5,487,763 A | 1/1996 | More et al. | |
| 5,501,714 A | 3/1996 | Valentine et al. | |
| 5,535,708 A | 7/1996 | Valentine | |
| 5,584,894 A | 12/1996 | Peter-Hoblyn et al. | |
| 5,693,106 A | 12/1997 | Peter-Hoblyn et al. | |
| 5,732,548 A | 3/1998 | Peter-Hoblyn | |
| 5,743,922 A | 4/1998 | Peter-Hoblyn et al. | |
| 5,746,786 A | 5/1998 | Mueller et al. | |
| 5,749,928 A | 5/1998 | Epperly et al. | |
| 5,809,774 A | 9/1998 | Peter-Hoblyn et al. | |
| 5,819,529 A | 10/1998 | Peter-Hoblyn | |
| 5,992,354 A | 11/1999 | Ahern et al. | |
| 6,003,303 A | 12/1999 | Peter-Hoblyn et al. | |
| 6,039,772 A | 3/2000 | Orr | |
| 6,051,040 A | 4/2000 | Peter-Hoblyn | |
| 6,056,792 A * | 5/2000 | Barr et al. | 44/403 |

(Continued)

FOREIGN PATENT DOCUMENTS

| | | |
|---|---|---|
| GB | 2248068 A | 3/1992 |
| WO | WO 86/03492 | 6/1986 |
| WO | WO 93/12207 | 6/1993 |
| WO | WO 94/11467 | 5/1994 |
| WO | WO 96/09463 A1 | 3/1996 |
| WO | WO 98/33871 | 8/1998 |

OTHER PUBLICATIONS

International Search Report from Priority PCT Application PCT/AU02/01519, Dec. 2002.
International Preliminary Examination Report from Priority PCT Application PCT/AU02/01519, Mar. 2004.

*Primary Examiner*—Cephia D Toomer

(57) ABSTRACT

A method of improving the combustion of a fuel by adding a catalyst or combustion enhancer at an extremely low concentration, preferably in the range of 1 part catalyst per 200 million parts fuel to 1 part catalyst per 6 trillion parts fuel. The catalyst or combustion enhancer may be selected from a wide range of soluble compounds. The method may comprise the steps of an initial mixing of the catalyst or enhancer with a suitable solvent and then subsequent dilution steps using solvents or fuel. Suitable solvents include water, MTBE, methylketone, methylisobutylketone, butanol, isopropyl alcohol and other hydrophilic/oleophilic compounds.

27 Claims, No Drawings

U.S. PATENT DOCUMENTS

| | | |
|---|---|---|
| 6,074,444 A | 6/2000 | Bingley |
| 6,156,081 A | 12/2000 | Willis-New |
| 6,165,430 A | 12/2000 | Kudla et al. |
| 6,206,685 B1 | 3/2001 | Zamansky et al. |
| 6,419,477 B1 * | 7/2002 | Robinson ............... 431/4 |
| 6,629,407 B2 | 10/2003 | Roos et al. |
| 2001/0001354 A1 | 5/2001 | Peter-Hoblyn et al. |
| 2005/0044778 A1 | 3/2005 | Orr |
| 2005/0081430 A1 | 4/2005 | Carroll et al. |

* cited by examiner

METHOD AND COMPOSITION FOR IMPROVING FUEL COMBUSTION

CROSS REFERENCE TO RELATED APPLICATION

This application gains priority from PCT Application PCT/AU02/01519 filed Nov. 8, 2002 that gains priority from GB 0126990.1 filed Nov. 9, 2001.

FIELD OF THE INVENTION

The present invention relates to improved combustion of fuels and in particular combustible hydrocarbon based fuels. More particularly, the invention relates to a method and composition for mixing a catalyst or enhancer with fuel to enhance combustion in an engine.

BACKGROUND

Combustion of fossil fuels and in particular oil derived fuels such as gasoline and diesel is never completely efficient. The consequences of inefficient combustion range through high fuel consumption, a build up of carbon on cylinder heads and on pistons, variations in motor efficiency and production of excess amounts of noxious bi-products such as carbon monoxide, partially burnt hydrocarbons and nitrogen oxides ("$NO_x$").

Various fuel additives have been proposed to improve fuel economy and reduce combustion exhaust pollutants. Unburnt and partially burnt fuel represent both pollution of the combustion process and a financial loss to a purchaser of the fuel. The prior art has suggested adding combustion improvers for diverse types of fuel usages including flame burners, diesel engines, gasoline internal combustion engines and various turbine configurations. These prior art additives have been in various forms such as in a liquid state mixed with liquid carriers and some in a solid state as appropriate for the combustion system under review.

U.S. Pat. No. 4,129,421 to Webb discloses a catalytic fuel additive for use in engines or furnaces. The additive employs a solution of picric acid and ferrous sulphate in specified alcohol. An example shows the additive employed for use in gasoline engines at levels supplying around 10 parts per billion of the combined catalyst. The disclosure indicates higher but unspecified levels of use for heavy fuel oils. In all cases the catalyst, is fully dissolved in the fuel.

U.S. Pat. No. 2,402,427 to Miller and Liber discloses the use of broad groupings of diesel-fuel-soluble organic and organo metallic compounds as ignition promoters at concentrations of from 0.02 to 3% (ie. 200-30,000 parts per million).

Among the early patents on catalytic metal fuel additives, U.S. Pat. Nos. 2,086,775 and 2,151,432 to Lyons and McKone disclose adding from 0.001 to 0.0085% (ie. from 10-850 parts per million) of an organo metallic compound or mixture to a base fuel such as gasoline, benzene, fuel, oil, kerosene or blends to improve various aspects of engine performance. Among the metals disclosed in U.S. Pat. No. 2,086,775 are cobalt, nickel manganese, iron, copper, uranium, molybdenum, vanadium, zirconium, beryllium, platinum, palladium, chromium, aluminium, thorium and the rare earth metals such as cenum.

Those disclosed in U.S. Pat. No. 2,151,432 include solanum, antimony, arsenic, bismuth, cadminum, admeium, tellurium, thallium, tin, barium, boron, cesium, didymium, lanthanum, potassium, sodium, tantalum, titanium, tungsten and zinc. In both patents, the preferred organo metallic compounds were beta diketone and derivatives and their homologues such as the metal acetylacetonates, proprionyl acetonates, formyl acetonates and the like.

The Lyons and McKone disclosures state that concentrations of from 0.001 to 0.04% (ie. from 10-400 parts per million) are not effective to improve combustion efficiency as introduced, but may become so upon prolonged use as catalytically active deposits are built-up in the combustion chamber. The disclosures further state that about 0.01% (ie. 100 parts per million) of the organo metallic compound is usually sufficient, once the requisite amount of catalytically active deposits have been built up to perpetuate the amount of deposits by replacement of losses therefrom.

U.S. Pat. Nos. 4,891,050 and 4,892,562 to Bowers and Sprague disclose the use of fuel soluble platinum group metal compounds which were effective at what was labelled "extremely low concentrations" to improve fuel economy in gasoline and diesel engines respectively. In this context, extremely low levels were seen as being in the range of 0.01 to 1.0 parts per million of the platinum group metal compared to the fuel to which it was added.

U.S. Pat. No. 4,629,472 describes the use of 0.005 to 0.5 parts per million catalyst to fuel oil when the catalyst was measured as metal on a weight basis. The preferred range of catalyst was 0.02 to 0.06 parts per million (ie. 2 parts per 100 million to 6 parts per 100 million). It is apparent that the prior art teaches there is a lower limit at which catalysts cease contributing significantly to the combustion process. As noted earlier, the Lyons and McKone documents indicated that concentrations of around 10400 parts per million of catalyst were only effective once an adequate amount of catalytically active build-up arose.

Even U.S. Pat. No. 4,129,421 to Webb indicated a level of 1 part per 100 million as necessary to provide a significant effect. It would be of advantage if a method could be described to provide combustion enhancement at lower levels of additive than previously used.

SUMMARY OF THE INVENTION

Broadly the present invention is a method of enhancing the combustion of fuels by adding a combustion catalyst or enhancer to the fuel at an extremely low level depending on the fuel combustion system and method of introducing the catalyst. Preferably the extremely low level is less than 1 part of catalyst or enhancer per 100 million parts of fuel calculated by weight. The catalyst or enhancer may be beneficially added at less than 1 part per 500 million and indeed less than 1 part of catalyst or enhancer per billion parts of fuel calculated on a weight basis. The extremely low level may be a level of less than 1 part of catalyst or enhancer per 50 billion parts of fuel calculated by weight. Most preferably the catalyst or enhancer is present in the fuel in the range of around 1 part of catalyst per 100 billion parts of fuel to around 1 part of catalyst or enhancer per 6 trillion parts of fuel calculated by weight.

A suitable catalyst or enhancer may be one or more of polyvinyl chloride, potassium hexachloroplatinate, hydrogen hexachloroplatinate or ammonium nitrate, although any suitable catalyst or enhancer or combination thereof known to a skilled addressee may be used.

Combustion may occur in an internal combustion engine, a turbine or in a boiler, jet engine, a furnace or otherwise for a purpose such as providing heat or energy. The combustion catalyst or enhancer may be added to solid fuel, preferably by spraying. Alternatively the combustion catalyst or enhancer may be added to a gaseous fuel. Addition of the combustion catalyst or enhancer may be effected in a gas stream supplying oxygen to a combustion process or in steam added to a turbine.

The method may also include altering the ratio of air to fuel in a combustion mixture to increase the amount of air or decrease the amount of fuel.

In a second aspect the invention resides in a method of mixing a combustion catalyst or enhancer with a fuel at extremely low levels of the combustion catalyst, said method including the steps of:

dissolving the combustion catalyst in water or other suitable solvent to form a first premix;

diluting the first premix by mixing it with a hydrophilic/oleophilic organic compound to form a second premix;

diluting the second premix with fuel or other suitable material in one or more dilution steps to provide a desired extremely low level of catalyst.

Suitably the hydrophilic/oleophilic organic compound may be isopropyl alcohol or Methyl Tertiary Butyl Ether ("MTBE") and/or methylethylketone (MEK) and/or methylisobutylketone (MIBK) and/or butanol. Methanol may also be suitable as can a variety of hydrophilic/oleophilic materials.

In a third aspect the invention resides in a method of mixing a combustion catalyst or combustion enhancer with a fuel said method comprising the steps of:

mixing the combustion catalyst with a hydrophilic/oleophilic organic compound such as isopropyl alcohol, MTBE or similar substance, to provide a premix; and mixing the premix with a fuel.

In a fourth aspect, the invention resides in a composition pack comprising one or more catalysts or combustion enhancers and a solvent, said solvent comprising water and/or isopropyl alcohol and/or MTBE or other suitable solvent wherein addition of the composition pack to a pre-determined amount of fuel will provide a mixture with the catalyst present at a concentration of less than 1 part per 100 million parts of fuel.

In a fifth aspect, the invention may reside in a composition comprising a fuel and a combustion catalyst wherein the combustion catalyst is present in a concentration of less than 1 part per 100 million parts of fuel and most preferably between around 1 part per 240 billion parts of fuel to around 1 part per 1.2 trillion parts of fuel and may be as low as 1 part per 6 trillion parts of fuel.

DETAILED DESCRIPTION OF THE PREFERRED EMBODIMENT

In this description, the term "internal combustion engine" includes all Otto and diesel gasoline and compressed gas engines or other engines, for both mobile (including marine) and stationary applications and of the two stroke per cycle, four stroke per cycle and rotary types. However it should be understood that the present invention may be worked with any suitable form of combustion such as in boilers, turbines and heating fires. Use of the method and composition of this invention is not restricted to use in engines alone but has a particular benefit in engine applications.

The present invention is predicated at least in part on the discovery by the inventors that combustion catalysts or combustion enhancers may be effective at extremely low levels when mixed with fuel. Those levels may be in a range as low as 1 part per 240,000,000,000 parts (ie. 1 part per 240 billion of fuel) to as low as 6,000,000,000,000 parts of fuel (ie. 1 part per 6 trillion of fuel) or even lower.

The combustion catalyst or enhancer may comprise any catalyst or enhancer known to a skilled addressee. The catalyst or enhancer may include one or more members of the group in Table I below:

TABLE I ruthenium (IV) oxide
ruthenium (III) chloride
ruthenium (III) chloride trihydrate
ruthenium (III) bromide, and its hydrates
ammonium aquopentachlororuthenium (III), $(NH_4)_2 RuCl_5 \cdot H_2O$
potassium ruthenium (VI) oxide
rhodium (III) oxide
rhodium (III) chloride, and its hydrates
rhodium (III) nitrate, and its hydrates
iridium (III) chloride
iridium (III) oxide
iridium (IV) oxide
hydrogen hexachloroiridium (IV), and its hydrates
ammonium hexachloroiridium (IV), and its hydrates
osmium tetroxide
osmium (III) chloride
platinum black
platinum (IV) oxide, and its hydrates
platinum (II) chloride
platinum (IV) chloride
Polyvinylchloride
hydrogen hexachloroplatinum (IV) hydrate
hydrogen hexahydroxoplatinum (IV)
tetraammineplatinum (II) chloride monohydrate
dinitritodiammineplatinum (II)
dihydrogen sulphatodinitrito platinum (II)
tetraammineplatinum (II) dinitrate
palladium (II) chloride
palladium (II) oxide
palladium (II) nitratedihydrate
ammonium hexachloropalladium (IV)
tetraamminepalladium (II) nitrate
potassium tetracyanopalladium (II) trihydrate
potassium perrhenate
rhenium (III) chloride
tris (acetyl acetonate) rhenium (III)
cis-Dichloro(2,2'-bipyridine)platinum (II), $PtCl_2(C_{10}H_8N_2)$
dichloro(1,5-cyclooctadiene)platinum (II), $PtCl_2(C_8H_{12})$
2-hydroxyethyanethiolato(2,2,'2''-terpyridine)platinum (II) nitrate, $[Pt(C_2H_5OS)(C_{15}H_{11}N_3)]NO_3$
tricarbonylchloro iridium (I), $[IrCl(CO)_3]n$
chloro(1,5-cyclooctadiene)iridium (I) dimer $[IrCl(C_8H_{12})]_2$
trans-dichlorobis(ethylenediamine), iridium (III) chloride, trans-$[IrCl_2(C_2H_8N_2)_2]Cl$
rhodium (II) octanoate dimer, $Rh_2[O_2C(CH_2)_6CH_3]_4$
acetylacetonato(1,5-cyclooctadiene), rhodium (I), $Rh(C_8H_{12})(C_5H_7O_2)$
acetylacetonato(norbornadiene), rhodium (I), $Rh(C_7H_8)(C_5H_7O_2)$
hydridotetrakis(triphenylphosphine), rhodium (I), $RhH(PPh_3)_4$
diacetatobis(triphenylphosphine), palladium (II) $(CH_3CO_2)_2Pd(PPh_3)_2$
Bis(dibenzylideneacetone), palladium (O) $Pd(C_{17}H_{14}O)_2$
Dichloro[1,2-bis(diphenylphosphino)ethane]palladium (II) $PdCl_2(Ph_2PCH_2CH_2PPh_2)$
Palladium (II) trifluoracetate $Pd(CF_3CO_2)_2$
Acetatohydridotris(triphenylphosphine)ruthenium (II) $RuH(OCOCH_3)(PPh_3)_3$
Bis(benzene)dichlorodi-.mu.-chlorodiruthenium (II) $[RuCl_2(C_6H_6)_2]_2$
Tris(2,2'-bipyridine)ruthenium (O)$(C_{10}H_8N_2)_3Ru$
Carbonyldihydridotris(triphenylphosphine)ruthenium (II) $RuH_2(CO)(PPh_3)_3$
Bis(cyclopentadienyl)ruthenium (II) "Ruthenocene" $(C_5H_5)_2Ru$
Dihydridotetrakis(triphenylphosphine)ruthenium (II) $RuH_2(PPh_3)_4$
Ruthenium(III)hexafluoroacetylacetonate $Ru(CF_3COCHCOCF_3)_3$
Ammonium nitrate
Dichloroethylenediammineplatinum (II) $[Pt(C_2H_8N_2)Cl_2]$
Bis(acetylacetonato)platinum (II) $[Pt(C_5H_7O_2)_2]$
Dichlorobis(triphenylphosphine)platinum (II) $[PtCl_2(PPh_3)_2]$
Tetrakis(triphenylphosphine)platinum (O) $[Pt(PPh_3)_4]$
Bis(acetylacetonato)palladium (II) $[Pd(C_5H_7O_2)_2]$
Dichloro(cycloocta-1,5-diene)palladium (II) $[Pd(C_8H_{12})Cl_2]$
Chloro(.pi.-allyl)palladium (II) dimer $[Pd(.pi.-C_3H_5)Cl]_2$
Palladium (II) acetate trimer $[Pd(CH_3CO_2)_2]_3$
Tris(acetylacetonato)ruthenium (III) $[Ru(C_5H_7O_2)_3]$
Hydridocarbonyltris(triphenylphosphine)rhodium (I) $[Rh(H)(CO)(PPh_3)_3]$
Acetylacetonatodicarbonylrhodium (I) $[Rh(CO)_2(C_5H_7O_2)]$ TABLE I-continued Tris(acetylacetonato)rhodium (III) [Rh(C$_5$H$_7$O$_2$)$_3$]
Bromotris(triphenylphosphine)rhodium (I) [RhBr(PPh$_3$)$_3$]
Rhodium (II) acetate dimer [Rh$_2$(CO$_2$CH$_3$)$_4$]
Tris(acetylacetonato)iridium (III) [Ir(C$_5$H$_7$O$_2$)$_3$]
Dodecacarbonyltriosmium (O) Os$_3$(CO)$_{12}$.

A preferred group is that set out in Table 2 below:

TABLE 2

PALLADIUM

Palladium (II) Chloride also as the bromide, iodide, nitrate hydrate, oxide, sulfate hydrate and hydroxide
Tris(dibenzylideneacetone)dipalladium (0)
Dichloro(1,1-bisdiphenylphosphino)ferrocenepalladium (II)
Allylpalladium (II) Chloride Dimer
trans-Dichlorobis(acetonitrile)palladium (II)
trans-Dichlorobis(benzonitrile)palladium (II)
trans-Dichlorobis(triphenylphosphine)palladium (II)
trans-Acetato(triphenylphosphine)palladium (II)
Dichloro(norbornadiene)palladium (II)
2,4 ñ Pentanedionate Palladium (II)

PLATINUM

Platinum (II) Chloride*
Platinum (IV) Chloride*
*Also as the bromide, iodide and sulfide salts.
Platinum (IV) Oxide Hydrate (Adamsi Catalyst)
2,4 ñ Pentanedionate Platinum (II)
Dibromo(1,5-cyclooctadiene)platinum (II)
Diiodo(1,5-cyclooctadiene)platinum (II)
Diphenyl(1,5-cyclooctadiene)platinum (II)
Dichlorobis(acetonitrile)platinum (II)
Dichlorobis(benzonitrile)platinum (II)
Dichloro(norbornadiene)platinum (II)
Dihydrogen Hexachloroplatinum (IV)

RHODIUM

Rhodium (III) Chloride Hydrate
Rhodium (III) Iodide
*Also available as the oxide, sulfate and bromide salts.
2,4-Pentanedionate Rhodium (III)
Dicarbonyl 2,4-Pentanedionate Rhodium (I)
Chlorotris(triphenylphosphine)rhodium (I)
Bromocarbonylbis(triphenylphosphine)rhodium (I)
Chlorocarbonylbis(triphenylphosphine)rhodium (I)
Chloro(norbornanediene)rhodium (I) Dimer
Bis(1,5-cyclooctadiene)rhodium (I) tetrafluoroborate

RUTHENIUM

Ruthenium (III) Chloride Hydrate
*Also available in the oxide, bromide, iodide and ammine salts.
Dichlorotris(triphenylphosphine)ruthenium (II)
Dichlorotricarbonylruthenium (II) Dimer
2,4-Pentanedionate Ruthenium (III)
Dichloro(1,5-cyclooctadiene)ruthenium (III) Oligomer
Dicarbonylbis(triphenylphosphine)ruthenium (II)
Tri-ruthenium (0) Dodecacarbonyl
Ruthenium Nitrosylnitrate

IRIDIUM

Iridium (IV) Chloride Hydrate
*Also available in the iridium (III) chloride, oxide, hydroxide, bromide, sulfate and iodide salts.
2,4-Pentanedionate Iridium (III)
2,4-Pentanedionate Dicarbonyliridium (I)
Chlorocarbonylbis(triphenylphosphine)iridium (I)
Hydridocarbonyltris(triphenylphosphine)iridium (I)
Bis(1,5-cyclooctadiene)iridium (I) tetrafluoroborate

OSMIUM

Osmium (VIII) Oxide

Further catalysts or enhancers are set out in Table 3.

TABLE 3

Lanthanum
Cerium
Praeseodymium
Neodymium
Promethium
Samarium
Europium
Gadolinium
Terbium
Dysprosium
Holmium
Erbium
Thulium
Ytterbium
Lutetium The catalysts or enhancers may be in the form of fluorides, chlorides, bromides, sulphates, nitrates and hydrates in soluble form. The catalyst or enhancer may be selected from the list in Table 4.

TABLE 4

Cobalt
Nickel
Manganese
Iron
Copper
Molybdenun
Vanadium
Zirconium
Beryllium
Chromium
Aluminium
Thorium
Cadmium
Tin
Cesium
Potassium
Sodium
Tantalum
Titanium
Carbon
Lithium Preferably the elements of Table 4 are present as fluorides, chlorides, bromides, sulphates, nitrates or hydrates.

It may be preferred to use organometallic complexes of the listed catalysts and enhancers. Other electrolytes soluble in solvents at ambient temperatures may also be beneficially applied.

In certain circumstances, it may be possible to have dilutions of combustion catalysts or enhancers below 1 part in 6 trillion of fuel. It is envisaged that benefits may be obtained with levels as low as 1 part in 8 trillion or 10 trillion or even 12 trillion parts of fuel.

The combustion catalysts may include the noble metals being silver, gold, platinum, in particular, but also copper, mercury, aluminum palladium, rhodium iridium and assnium.

When using the method of the present invention, the catalyst may originate from the platinum group compounds. The catalysts may be organic in nature. Suitable platinum group compounds may be potassium hexachloroplatinate (IV) or hyrogen hexachloroplatinate (IV). Alternatively the combustion catalyst or enhancer may be polyvinyl chloride ("PVC") and/or ammonium nitrate.

In this specification, "Combustion Catalyst" or "Catalyst" or "Combustion Enhancer" or "Enhancer" or variations thereof include a substance for addition to fuel which enhances the combustion of a primary fuel to accomplish at least in part, one or more of complete or improved oxidation of fuel, minimise or decrease formation of deposits and exhaust emissions, burn off existing deposits, and improve overall operating efficiency of fuel combustion systems such as an internal combustion engine. While "catalyst" includes a true catalyst in the form of a substance which modifies and increases the rate of a reaction without being consumed in the process, it is not restricted to that definition and in this specification also includes substances which enhance combustion but are also consumed. The terms may be used as alternatives or additively but should be understood to extend to both classes of compounds. In this specification, reference to combustion catalyst or enhancer is reference to soluble compounds.

An internal combustion engine includes an engine in which the fuel is ignited either by spark or compression including but not limited to the otto engine or gasoline engine, diesel or oil engine, gas turbine, stratified charge and Wankel and other rotary type engines, jet engines and the like.

Fuels with which the present invention may be used include hydrocarbon fuels such as gas or gasoline, diesel fuel, gasohol and biofuels. Other fuels such as methane, propane, butane, residual fuel, kerosene and aviation gas can also be used consistent with engine design and availability. Distillate fuels are well known and usually contain a major portion of a normally liquid fuel such as hydrocarbonaceous petroleum distillate fuel (eg. motor gasoline and diesel fuel). Such fuels can also contain materials such as alcohols, ethers, organonitrate compounds and the like (eg. methanol, ethanol, diethylether, methylether and nitromethane). Also within the scope of this invention are liquid fuels derived from vegetable or mineral sources such as corn, alfalfa, shale and coal. Examples of some suitable fuel mixtures include combinations of gasoline and ethanol, diesel fuel and ether, and gasoline and nitromethane. Particularly preferred fuels are diesel fuel and gasoline. The expression may also include solid or gaseous fuels, bunker fuel and other heavy oils.

The catalysts or enhancers may be first combined with a suitable carrier which may be a solvent such as water or an organic or other suitable solvent. This first combination forms an initial premix. The carrying medium and catalyst may then be added to a further diluting compound to form a second premix. A suitable diluting compound in this regard is isopropyl alcohol which may mix with both water and gasoline, diesel or other hydrocarbon fuels. Alternatively or additionally, it may be possible to use MTBE, methanol, ethanol, ethylene glycol, ether or monoethyelene or other types of hydrophilic/oleophilic products.

The second premix is then further diluted with a further suitable carrier to form a third premix or catalyst essence. The further carrier may be the same as used in the second premix step or it may be the end fuel or indeed any suitable material that would facilitate mixing or dispersal of the second premix into the final fuel component. The catalyst essence is easily transportable at this concentration and may be forwarded and transported to an end user conveniently and economically.

The catalyst essence may be further diluted. A suitable factor of dilution may be, for example, a factor of 1000. The diluting material may be the same medium used in the third premixing step or it may be the end fuel. This dilution forms the final premix combination or the basic mixture, which may be then added to the final fuel for combustion.

The examples set out below are by way of illustration only and should not be viewed as limiting the scope of the present inventive concept. It is important that complete and even dispersal occurs at each dilution stage. The use of an electric agitation means is preferred for mixing.

EXAMPLE 1

An example of the method of catalyst addition according to the above described invention is as follows:

Step 1

4% to 10% by weight soluble catalyst is dissolved in 96-90% water, preferably purified. Hydrogen peroxide may also be used. Alternatively the catalyst may be mixed with an alcohol, preferably a simple chain alcohol. The alcohol may be a light alcohol. Although the range is given as 4% to 10%, the concentration of catalyst may be higher or, indeed, lower, provided the catalyst is evenly dissolved or distributed through the mixing solution or solvent. One eventual aim is to produce a relatively even distribution of catalyst in the final fuel mixture.

Step 2

One gram of the combination of step 1 is added to 19 grams of isopropyl alcohol, and/or MTBE. In an alternative method, water may be used in Step 2. It is also possible to use fuel as the diluent in this step.

Step 3

The combined mixture of step 2 (ie. 20 grams) is added to 980 grams of a suitable diluting liquid. The diluting liquid may be the final fuel component or alternatively it may be a substance which will disperse or dissolve in the final fuel component. Isopropyl alcohol and MTBE are examples of such suitable substances. Water may be also used.

Step 4

The product of step 3 may then be diluted by a further factor of 1000 in one or more of the compounds as used in step 3 or in a volume of the final combustible fuel component. This dilution forms the basic catalyst mixture. The dilution factor of 1000 may be varied if desired to produce a preferred concentration of catalyst in the final product. If water is used in Step 4, it is preferred to add 1 part of the substance produced to 20 parts of isopropyl alcohol and/or MTBE, which may then be added to fuel in Step 5. If water is used in Step 4 as the mixing liquid or solvent and the fuel is diesel, the product of Step 4 may be added directly to diesel fuel at a rate of 50 ppm or less. Some difficulties may be encountered at the higher rate in cold weather.

Step 5

The basic catalyst mixture of step 4 is added to fuel at the ratio of between around 10 parts per million to 80 parts per million of the fuel, by weight to provide the ultimate concentration in the range of about 1 part catalyst per 240,000,000,000 (240 billion) parts of fuel to 1 part catalyst per 6,000,000,000,000 (6 trillion) parts of fuel by weight. It is clear to a person skilled in the art that suitable amendments may be made to give any desired concentration of less than 1 part of catalyst or enhancer per 100 million parts of fuel and greater or equal to 1 part catalyst per 6 trillion parts of fuel (6,000,000,000,000).

When a fully miscible hydrophilic and oleophilic organic compound, such as isopropyl alcohol, is used, the ultimate mixing with fuel is relatively straight forward. However other ingredients may require considerable mechanical mixing or agitation to disperse or dissolve effectively. This may be the case particularly when significant quantities of water are used.

If the combustion catalyst is dissolved initially in water and then extended with water by a factor of 10 to 1 or 1000 to 1 before a hydrophilic/oleophilic compound is added, it has been found by the inventors that it is difficult to fully disperse the catalyst through the fuel and constant or intensive mixing or agitation may be required to achieve a satisfactory result. It is noted that the scope of the invention extends to combinations of catalysts or enhancers. The combined total of catalyst or enhancers may still fall within the preferred limits. Alternatively, the individual additives may be within the preferred limits while in combination with other additives.

EXAMPLE 2

Step 1

Eight parts by weight of catalyst are dissolved in 92 parts of water or other solvent.

Step 2

One part of the mixture of step 1 is added to 1000 to 2000 parts by weight of a hydrophilic/oleophilic organic compound such as isopropyl alcohol. This forms a mixture which is fully miscible with fuel. Alternative mixing liquids are MTBE and/or water or even the end fuel. This premix may be termed the essential premix.

Step 3

The essential premix may be diluted by a factor of 1000 with fuel or a material that is fully compatible with fuel to produce a premix which may be termed the basic premix. At this stage the catalyst may be present at a concentration of 1 part per 12 million to 1 part per 100 million. The compatible substance may, for example, be one or more of isopropyl alcohol, MTBE and water.

The basic premix may then be added to fuel at the rate to 10 to 50 parts per million.

Step 4

The basic premix may be extended by a factor of 20,000 to 100,000 times when added to the final fuel volume. The dilution factor is selected to give a preferred result wherein the catalyst is present in the fuel that is combusted in the range of about 1 part per 240 billion to about 1 part per 1.2 trillion. Suitable dilution factors may be selected to provide a level as low as 1 part per 6 trillion parts of fuel. However, it should be understood that the range may be less than 1 part in 100 million of catalyst to fuel and as low as 1 part in 6 trillion of catalyst to fuel.

The inventors have unexpectedly shown that catalysts, including combustion enhancers, may be effective at extremely low levels which may be difficult to detect.

The steps of the method may be separated in time. Additionally individual steps may be broken down into multiple sub-steps that a person skilled in the art would understand to provide the same results.

Without seeking to limit the invention to any one theory of operation, the inventors speculate that small concentrations of a catalyst cause the molecules in fuel to be ideally positioned to contact each other and to combine with oxygen. That is, the number of catalyst molecules is very small compared to the number of fuel molecules and this allows a maximum number of fuel molecules to reach an individual catalyst molecule.

It is known that catalysts at high concentrations often form complexes. It is theorised that any of the catalysts being used have a high efficacy at high concentrations because the complexes of the catalyst take up less space than an equivalent number of individual catalyst molecules. As the catalyst is diluted, the complexes become located further apart and there is more fuel in between them so the effectiveness of the catalytic presence is decreased. It also theorised that as the catalyst is further diluted the complexes begin to decrease in size which results in less molecules being present in each complex. This may allow more fuel molecules to reach more catalyst molecules and so the effectiveness of the catalyst begins to increase. The limit of this effect may be achieved when a dilution is obtained in which only individual catalyst molecules are present (ie. no complexes of catalysts) at which stage the catalyst again displays an effective combustion enhancing capacity. Any further dilution after this point will result in the spread of individual catalyst molecules further and further apart with substantial numbers of intervening fuel molecules. Thus a rapid decrease in effectiveness will eventually occur. From initial observations, it appears that the maximum effectiveness of the present invention may occur in the range of about 1 part of catalyst per 240 billion parts of fuel to 1 part per 1.2 trillion parts of fuel. However, it is noted that a combustion enhancing efficacy is provided over a considerable range in the extremely low range of catalyst presence provided for by the present invention and may extend as low as 1 part catalyst per 6 trillion parts of fuel or even lower.

As a further possible part of the theoretical basis of the present invention it is noted that Avogadro's number is $6.02 \times 10^{23}$ which is the number of atoms contained in 1 mole of any substance. Therefore even at the dilution of one part in a trillion, there would be approximately $6.02 \times 10^{11}$ catalyst molecules for every $6.02 \times 20^{23}$ fuel molecules. Therefore every litre of fuel even at extremely low concentrations will still contain billions of catalyst molecules. As a result, it appears that use of a catalyst will provide a type of reverse Bell curve of performance for a catalyst that provides efficacy at a relatively high level which then decreases with decreasing concentrations of catalyst before producing an almost paradoxical up-swing of effectiveness as the concentration of catalyst continues to decrease. This effectiveness increases with decreasing presence of the catalyst until it eventually commences to fall away rapidly. This may occur when a dilution in excess in 1 part of catalyst to 6 trillion parts of fuel is obtained. However, as noted, the applicant does not wish to be bound to any one theory and offers the above by way of speculative explanation only.

EXAMPLE 3

Step 1

8 parts by weight of catalyst (polyvinyl chloride or potassium hexachloroplatinate (IV), hydrogen hexachloroplatinate (IV) or ammonium nitrate or any heavy metal salt catalyst that will not interfere with other catalysts present in a combustion or exhaust system) is dissolved in 92 parts by weight of water.

Step 2

One part of the mixture of step 1 is added to 1000 to 2000 parts of a hydrophilic/oleophilic organic compound (eg. isopropyl alcohol or MTBE) to make a mixture which is miscible with fuel and which may be termed the "essential" premix.

Step 3

One part of the essential premix in step 2 is added to 1000 parts of the end fuel type to produce a final premix which may be termed "the basic premix".

Step 4

The basic premix is added to fuel to be combusted at the rate of approximately 50 parts per million. This provides the final combustible mixture which preferably has catalyst or enhancer present in the range of 1 part per 240 billion to 1 part per 1.2 trillion. Suitable dilution factors may be selected to give a range of between 1 part per 200 million to 1 part per 6 trillion of fuel or even lower. The basic premix may be diluted to make it more accurately and easily measured when added to fuel.

Other heavy metal catalysts may be used in the method of Example 3. Particular usefulness is obtained when a salt form of a heavy metal is recruited, especially a chloride.

Using this method the inventors have surprisingly discovered that PVC which is not normally known as a catalyst or combustion enhancer may act as such.

It is preferred that the catalyst be present in the basic premix at approximately 1 part per 12 million to 1 part per 100 million of the mixture. The basic premix can be easily measured and added to fuel at the rate of 10 to 50 parts per million as required to provide preferred concentrations. The accuracy of this step may be enhanced by diluting the basic premix by a further factor of twenty prior to adding to the end fuel mixture.

The present invention may provide an advantage in that small amounts of catalyst may be dissolved initially in an amount of a hydrogen/oxygen compound such as water or hydrogen peroxide or in an organic solvent.

The method also provides a procedure for making the mixture miscible with fuel using a small amount of hydrophilic/oleophilic organic compound and then extending that mixture in the fuel in which it is to be used or with a material that readily mixes with the final fuel component.

In using the method of the present invention to its maximum advantage, it may be necessary to adjust settings controlling the ratio of air and fuel mixtures in a combustion engine. One advantage may arise from decreasing the fuel to air ratio as a result of the fuel being more completely and efficiently combusted to provide a higher energy return per volume. This may provide greater economy and also lower the emissions produced in the combustion engine.

When using the method of the present invention with solid fuel the catalyst mixture may be sprayed onto the solid fuel prior to combustion. The catalyst may be added on a weight basis to the same concentration as with a liquid mix. Alternatively, the catalyst mixture may be introduced through the air stream providing oxygen for combustion in an engine. A mixture of catalyst and solvent may be prepared and sprayed into an air stream at a predetermined amount to give a suitable low catalyst/fuel mixture. In some turbines, especially those used to generate electricity, steam is introduced to cool the combustion chamber. The catalyst may be introduced in these applications through steam. The catalyst may be added directly to steam or, preferably, first combined with water, isopropyl alcohol, MTBE or other suitable product. The rate of application will vary with relative quantities of steam and fuel but may be easily calculated by a skilled addressee to provide an end mixture of catalyst and fuel in the preferred range.

In one embodiment the present method may be worked by adding catalysts at extremely low levels to lubricant engine oil so that the catalyst is supplied to the combustion chamber by the lubrication of cylinders with engine oil. In this instance, the catalyst may be used at a greater concentration in the lubricant as the amount of oil left residual on a cylinder barrel between combustion cycles is minute. The concentration of catalyst in engine oil may suitably be in the range of 1 part per million.

The advantages provided by the present invention include economy and increased efficiency. Fuel will burn more effectively and completely to provide an increased energy yield. A lower excitation rate is required to initiate combustion and a more even combustion is obtained throughout the air fuel mixture. This results in an avoidance of hot spots which risk damage to an engine and produce $NO_x$. The more complete combustion may cause combustion of carbon and therefore avoidance of build up of deposits in cylinders.

The incorporation of the combustion catalysts into fuel may reduce emissions and smoke formation due to incomplete combustion deposits.

Although the description has been in relation to ratios based on weight, it is readily apparent that ratios may be equally well determined on a volume basis or a weight to volume basis.

Throughout the specification the aim has been to describe the preferred embodiments of the invention without limiting the invention to any one embodiment or specific collection of features. Those of skill in the art will therefore appreciate that, in light of the instant disclosure, various modifications and changes can be made in the particular embodiments exemplified without departing from the scope of the present invention. All such modifications and changes are intended to be included within the scope of the appendant claims.

What is claimed is:

1. A method of improving combustion of a fuel, said method comprising the step of adding one or more combustion catalysts or enhancers to the fuel at a concentration of less than 1 part by weight of combustion catalyst or enhancer per 1000 million parts of fuel; wherein the adding step comprises dissolving the one or more combustion catalysts or enhancers in the fuel or a solvent and dispersing the dissolved one or more combustion catalysts or enhancers in the fuel; wherein the one or more combustion catalysts or enhancers are at least one of ruthenium (IV) oxide, ruthenium (III) chloride, ruthenium (III) chloride trihydrate, ruthenium (III) bromide and its hydrates, ammonium aquopentachlororuthenium (III) $(NH_4)_2RuCl_5.H_2O$, potassium ruthenium (VI) oxide, rhodium (III) oxide, rhodium (III) chloride and its hydrates, rhodium (III) nitrate and its hydrates, iridium (III) chloride, iridium (III) oxide, iridium (IV) oxide, hydrogen hexachloroiridium (IV) and its hydrates, ammonium hexachloroiridium (IV) and its hydrates, osmium tetroxide, osmium (III) chloride, platinum black, platinum (IV) oxide and its hydrates, platinum (II) chloride, platinum (IV) chloride, polyvinylchloride, ammonium nitrate, hydrogen hexachloroplatinum (IV) hydrate, hydrogen hexahydroxoplatinum (IV), potassium hexachloroplatinate (IV); hydrogen hexachloroplatinate (IV); tetraamineplatinum (II) chloride monohydrate, dinitritodiamineplatinum (II), dihydrogen sulphatodinitrito platinum (II), tetraamineplatinum (II) dinitrate, palladium (II) chloride, palladium (II) oxide, palladium (II) nitratedihydrate, ammonium hexachloropalladium (IV), tetraaminepalladium (II) nitrate, potassium tetracyanopalladium (II) trihydrate, potassium perrhenate, rhenium (III) chloride, tris (acetyl acetonate) rhenium (III), cis-Dichloro(2, 2'-bipyridine)platinum (II) $PtCl_2(C_{10}H_8N_2)$, dichloro(1,5-cyclooctadiene)platinum (II) $PtCl_2(C_8H_{12})$, 2-hydroxyethanethiolato(2,2',2"-terpyridine)platinum (II) nitrate [Pt $(C_2H_5OS)$ $(C_{15}H_{11}N_3)]NO_3$, tricarbonylchloroiridium (I), [IrCl $(CO)_3]_n$, chloro(1,5-cyclooctadiene)iridium (I) dimer [IrCl $(C_8H_{12})]_2$, trans-dichlorobis (ethylenediamine)iridium (III) chloride trans-$[IrCl_2(C_2H_8N_2)_2]Cl$, rhodium (II) octanoate dimer $Rh_2[O_2C(CH_2)_6CH_3]_4$, acetylacetonato(1,5-cyclooctadiene) rhodium (I) $Rh(C_8H_{12})(C_5H_7O_2)$, acetylacetonato (norbornadiene) rhodium (I) $Rh(C_7H_8)(C_5H_7O_2)$, hydridotetrakis(triphenylphosphine) rhodium (I) RhH $(PPh_3)_4$, diacetatobis (triphenylphosphine)palladium (II)

$(CH_3CO_2)_2Pd(PPh_3)_2$, Bis(dibenzylideneacetone) palladium (0) $Pd(C_{17}H_{14}O)_2$, Dichloro [1,2-bis (diphenyiphosphino) ethane] palladium (II) $PdCl_2(Ph_2PCH_2CH_2PPh_2)$, Palladium (II) trifluoracetate $Pd(CF_3CO_2)_2$, Acetatohydridotris(triphenylphosphine)ruthenium (II) $RuH(OCOCH_3)(PPh_3)_3$, Bis (benzene)dichlorodi-.mu.-chlorodiruthenium (II)$[RuCl_2(C_6H_6)_2]_2$, Tris(2,2'-bipyridine)ruthenium (0) $(C_{10}H_8N_2)_3Ru$, Carbonyldihydridotris(triphenylphosphine) ruthenium (II) $RuH_2(CO)(PPh_3)_3$, Bis(cyclopentadienyl)ruthenium (II) "Ruthenocene"$(C_5H_5)_2Ru$, Dihydridotetrakis(triphenylphosphine)ruthenium (II) $RuH_2(PPh_3)_4$, Ruthenium (III) hexafluoroacetylacetonate $Ru(CF_3COCHCOCF_3)_3$, Ammonium nitrate, Dichloroethylenediamineplatinum (II) $[Pt(C_2H_8N_2)Cl_2]$, Bis(acetylacetonato)platinum (II) $[Pt(C_5H_7O_2)_2]$, Dichlorobis(triphenylphosphine)platinum (II) $[Pt(Cl_2(PPh_3)_2]$, Tetrakis (triphenylphosphine)platinum (O) $[Pt(PPh_3)_4]$, Bis(acetylacetonato)palladium (II) $[Pd(C_5H_7O_2)_2]$, Dichloro(cycloocta-l,5-diene)palladium (II) $[Pd(C_8H_{12})Cl_2]$, Chloro(.pi.-allyl)palladium (II) dimer[Pd(.pi.—$C_3H_5$)Cl]$_2$, Palladium (II) acetate trimer {Pd$(CH_3CO_2)_2$]$_3$, Tris(acetylacetonato)ruthenium (III) [Ru$(C_5H_7O_2)_3$], Hydridocarbonyltris (triphenylphosphine) rhodium (I) $[Rh(H)(CO)(PPh_3)_3]$, Acetylacetonatodicarbonyirhodium (I) $[Rh(CO)_2(C_5H_7O_2)]$, Tris(acetylacetonato)rhodium (III) $[Rh(C_5H_7O_2)_3]$, Bromotris (triphenylphosphine) rhodium (I) $[RhBr(PPh_3)_3]$, Rhodium (II) acetate dimer $[Rh_2(CO_2CH_3)_4]$, Tris(acetylacetonato)iridium (III) $[Ir(C_5H_7O_2)_3]$, Dodecacarbonyltriosmium (0)$Os_3(CO)_{12}$, Palladium (II) Chloride or the bromide, iodide, nitrate hydrate, oxide, sulfate hydrate and hydroxide; Tris (dibenzylideneacetone) dipalladium (0); Dichloro(1,1-bisdiphenylphosphino) ferrocenepalladium (II); Allylpalladium (II) Chloride Dimer; trans-Dichlorobis (acetonitrile)palladium (II); trans-Dichlorobis (benzonitrile)palladium (II); trans-Dichlorobis (triphenylphosphine)palladium (II); trans-Acetato (triphenylphosphine)palladium (II); Dichloro(norbornadiene)palladium (II); 2,4 ñ Pentanedionate Palladium (II); Platinum (II) Chloride; Platinum (IV) Chloride, or bromide, iodide and sulfide salts; Platinum (IV) Oxide Hydrate (Adamsi Catalyst); 2,4 ñ Pentanedionate Platinum (II); Dibromo(1,5-cyclooctadiene) platinum (II); Diiodo(1,5-cyclooctadiene)platinum (II); Diphenyl(1,5-cyclooctadiene)platinum (II); Dichlorobis(acetonitrile)platinum (II); Dichlorobis(benzonitrile)platinum (II); Dichloro(norbornadiene)platinum (II); Dihydrogen Hexachloroplatinum (IV); Rhodium (III) Chloride Hydrate; Rhodium (III) Iodide, or oxide, sulfate or bromide salts; 2,4-Pentanedionate Rhodium (III); Dicarbonyl 2,4-Pentanedionate Rhodium (I); Chiorotris (triphenylphosphine)rhodium (I); Bromocarbonylbis (triphenylphosphine) rhodium (I); Chlorocarbonylbis (triphenylphosphine) rhodium (I); Chloro (norbornanediene)rhodium (I) Dimer; Bis(1,5-cyclooctadiene)rhodium (I) tetrafluoroborate; Ruthenium (III) Chloride Hydrate, or the oxide, bromide, iodide and amine salts; Dichlorotris(triphenylphosphine)ruthenium (II); Dichlorotricarbonylruthenium (II) Dimer; 2,4—Pentanedionate Ruthenium (III); Dichloro(l,5-cyclooctadiene)ruthenium (III) Oligomer; Dicarbonylbis(triphenylphosphine)ruthenium (II); Tri-ruthenium (0)Dodecacarbonyl; Ruthenium Nitrosylnitrate; Iridium (IV) Chloride Hydrate, iridium (III) chloride, oxide, hydroxide, bromide, sulfate or iodide salts; 2,4-Pentanedionate Iridium (III); 2,4-Pentanedionate Dicarbonyliridium (I); Chlorocarbonylbis (triphenylphosphine) iridium (I); Hydridocarbonyltris(triphenylphosphine)iridium (I); Bis (1,5-cyclooctadiene)iridium (I) tetrafluoroborate; Osmium (VIII) Oxide, the fluoride, chloride, bromide, sulfate, nitrate salts and hydrates in soluble form of the following metals: Lanthanum, Cerium, Praeseodymium, Neodymium, Promethium, Samarium, Europium, Gadolinium, Terbium, Dysprosium, Holmium, Erbium, Thulium, Ytterbium, Lutetium, the fluoride, chloride, bromide, sulfate or nitrate salts or hydrates of the following elements: Cobalt, Nickel, Manganese, Iron, Copper, Molybdenum, Vanadium, Zirconium, Chromium, Aluminum, Thorium, Cadmium, Tin, Tantalum, Titanium and Carbon or a noble element or compound thereof.

2. The method of claim 1 wherein the one or more combustion catalysts or enhancers are each added to the fuel at a concentration of less than 1 part of combustion catalyst or enhancer by weight per 100 billion parts of fuel.

3. The method of claim 1 wherein the one or more combustion catalysts or enhancers are each added to the fuel in the range of around 1 part by weight of combustion catalyst to 100 billion parts of fuel to around 1 part by weight of combustion catalyst to 6 trillion parts of fuel.

4. The method of claim 1 wherein the one or more combustion catalysts or enhancers are each added to the fuel in the range of around 1 part by weight of combustion catalyst to 100 billion parts of fuel to around 1 part by weight of combustion catalyst or enhancer to 12 trillion parts of fuel.

5. The method of claim 1 wherein at least one of the combustion catalysts or enhancers are selected from the group consisting of ruthenium (IV) oxide, ruthenium (III) chloride, ruthenium (III) chloride trihydrate, ruthenium (III) bromide and its hydrates, ammonium aquopentachlororuthenium (III) $(NH_4)_2RuCl_5.H_2O$, potassium ruthenium (VI) oxide, rhodium (III) oxide, rhodium (III) chloride and its hydrates, rhodium (III) nitrate and its hydrates, iridium (III) chloride, iridium (III) oxide, iridium (IV) oxide, hydrogen hexachloroiridium (IV) and its hydrates, ammonium hexachloroiridium (IV) and its hydrates, osmium tetroxide, osmium (III) chloride, platinum black, platinum (IV) oxide and its hydrates, platinum (II) chloride, platinum (IV) chloride, Polyvinylchloride, hydrogen hexachloroplatinum (IV) hydrate, hydrogen hexahydroxoplatinum (IV), tetraamineplatinum (II) chloride monohydrate, dinitritodiamineplatinum (II), dihydrogen sulphatodinitrito platinum (II), tetraamineplatinum (II) dinitrate, palladium (II) chloride, palladium (II) oxide, palladium (II) nitratedihydrate, ammonium hexachloropalladium (IV), tetraaminepalladium (II) nitrate, potassium tetracyanopalladium (II) trihydrate, potassium perrhenate, rhenium (III) chloride, tris (acetylacetonate) rhenium (III), cis-Dichloro(2,2'-bipyridine)platinum (II) $PtCl_2(C_{10}H_8N_2)$, dichloro(1,5-cyclooctadiene)platinum (II) $PtCl_2(C_8H_{12})$, 2-hydroxyethanethiolato(2,2 ',2"-terpyridine) platinum (II) nitrate $[Pt(C_2H_5OS)(C_{15}H_{11}N_3)]NO_3$, tricarbonylchloroiridium (I), $[IrCl(CO)_3]_n$, chloro(1,5-cyclooctadiene)iridium (I) dimer $[IrCl(C_8H_{12})]_2$, trans-dichlorobis (ethylenediamine)iridium (III) chloride trans-$[IrCl_2(C_2H_8N_2)_2]Cl$, rhodium (II) octanoate dimer $Rh_2[O_2C(CH_2)_6CH_3]_4$, acetylacetonato(1,5-cyclooctadiene) rhodium (I) $Rh(C_8H_{12})(C_5H_7O_2)$, acetylacetonato(norbornadiene) rhodium (I) $Rh(C_7H_8)(C_5H_7O_2)$, hydridotetrakis(triphenylphosphine) rhodium (I) $RhH(PPh_3)_4$, diacetatobis(triphenylphosphine)palladium (II) $(CH_3CO_2)_2Pd(PPh_3)_2$, Bis (dibenzylideneacetone) palladium(0) $Pd(C_{17}H_{14}O)_2$, Dichloro [1,2-bis(diphenylphosphino)ethane]palladium (II) $PdCl_2(Ph_2PCH_2CH_2PPh_2)$, Palladium (II) trifluoracetate $Pd(CF_3CO_2)_2$, Acetatohydridotris(triphenylphosphine)ruthenium (II) $RuH(OCOCH_3)(PPh_3)_3$, Bis(benzene)dichlorodi-.mu.-chlorodiruthenium (II) $[RuCl_2(C_6H_6)_2]_2$, Tris(2,2'-bipyridine)ruthenium (0) $(C_{10}H_8N_2)_3Ru$, Carbonyldihydridotris(triphenylphosphine)ruthenium (II) $RuH_2(CO)(PPh_3)_3$, Bis(cyclopentadienyl)ruthenium (II) "Ruthenocene" $(C_5H_5)_2Ru$, Dihydridotetrakis(triphenylphosphine)ruthenium (II) $RuH_2(PPh_3)_4$, Ruthenium (III)

hexafluoroacetylacetonate Ru(CF$_3$COCHCOCF$_3$)$_3$, Ammonium nitrate, Dichloroethylenediamineplatinum (II) [Pt(C$_2$H$_8$N$_2$)Cl$_2$], Bis(acetylacetonato)platinum (II) [Pt(C$_5$H$_7$O$_2$)$_2$], Dichlorobis(triphenylphosphine)platinum (II) [PtCl$_2$(PPh$_3$)$_2$], Tetrakis(triphenylphosphine)platinum (0) [Pt(PPh$_3$)$_4$], Bis(acetylacetonato)palladium (II) [Pd(C$_5$H$_7$O$_2$)$_2$], Dichloro(cycloocta-1,5-diene)palladium (II) [Pd(C$_8$H$_{12}$)Cl$_2$], Chloro(.pi.-allyl)palladium (II) dimer [Pd(.pi.-C$_3$H$_5$)Cl]$_2$, Palladium (II) acetate trimer [Pd(CH$_3$CO$_2$)$_2$]$_3$, Tris(acetylacetonato)ruthenium (III) [Ru(C$_5$H$_7$O$_2$)$_3$], Hydridocarbonyltris(triphenylphosphine)rhodium (I) [Rh(H)(CO)(PPh$_3$)$_3$], Acetylacetonatodicarbonylrhodium (I) [Rh(CO)$_2$(C$_5$H$_7$O$_2$)], Tris(acetylacetonato)rhodium (III) [Rh(C$_5$H$_7$O$_2$)$_3$], Bromotris(triphenylphosphine)rhodium (I) [RhBr(PPh$_3$)$_3$], Rhodium (II) acetate dimer [Rh$_2$(CO$_2$CH$_3$)$_4$], Tris(acetylacetonato)iridium (III) [Ir(C$_5$H$_7$O$_2$)$_3$], Dodecacarbonyltriosmium (O) Os$_3$(CO)$_{12}$.

6. The method of claim 1 wherein at least one of the combustion catalysts or enhancers are selected from the group consisting of Palladium (II) Chloride or the bromide, iodide, nitrate hydrate, oxide, sulfate hydrate and hydroxide; Tris(dibenzylideneacetone)dipalladium (0); Dichloro(1,1-bisdiphenylphosphino)ferrocenepalladium (II); Allylpalladium (II) Chloride Dimer; trans-Dichlorobis(acetonitrile) palladium (II); trans-Dichlorobis(benzonitrile)palladium (II); trans-Dichlorobis(triphenylphosphine)palladium (II); trans-Acetato(triphenylphosphine)palladium (II); Dichloro (norbornadiene)palladium (II); 2,4ñ Pentanedionate Palladium (II); Platinum (II) Chloride; Platinum (IV) Chloride, or bromide, iodide and sulfide salts; Platinum (IV) Oxide Hydrate (Adamsí Catalyst); 2,4ñ Pentanedionate Platinum (II); Dibromo(1,5-cyclooctadiene)platinum (II); Diiodo(1,5-cyclooctadiene)platinum (II); Diphenyl (1,5-cyclooctadiene) platinum (II); Dichlorobis(acetonitrile)platinum (II); Dichlorobis(benzonitrile)platinum (II); Dichloro(norbornadiene) platinum (II); Dihydrogen Hexachloroplatinum (IV); Rhodium (III) Chloride Hydrate; Rhodium (III) Iodide, or oxide, sulfate or bromide salts; 2,4-Pentanedionate Rhodium (III); Dicarbonyl 2,4-Pentanedionate Rhodium (I); Chlorotris (triphenylphosphine)rhodium (I); Bromocarbonylbis(triphenylphosphine)rhodium (I); Chlorocarbonylbis(triphenylphosphine)rhodium (I); Chloro(norbornanediene) rhodium (I) Dimer; Bis(1,5-cyclooctadiene)rhodium (I) tetrafluoroborate; Ruthenium (III) Chloride Hydrate, or the oxide, bromide, iodide and amine salts; Dichlorotris(triphenylphosphine)ruthenium (II); Dichlorotricarbonylruthenium (II) Dimer; 2,4-Pentanedionate Ruthenium (III); Dichloro(1,5-cyclooctadiene)ruthenium (III) Oligomer; Dicarbonylbis(triphenylphosphine)ruthenium (II); Tri-ruthenium (0) Dodecacarbonyl; Ruthenium Nitrosylnitrate; Iridium (IV) Chloride Hydrate, iridium (III) chloride, oxide, hydroxide, bromide, sulfate or iodide salts; 2,4-Pentanedionate Iridium (III); 2,4-Pentanedionate Dicarbonyliridium (I); Chlorocarbonylbis(triphenylphosphine)iridium (I); Hydridocarbonyltris(triphenylphosphine)iridium (I); Bis(1,5-cyclooctadiene)iridium (I) tetrafluoroborate; Osmium (VIII) Oxide.

7. The method of claim 1 wherein at least one of the combustion catalysts or enhancers are selected from the group consisting of fluoride, chloride, bromide, sulfate, nitrate salts and hydrates in soluble form of the following metals: Lanthanum, Cerium, Praeseodymium, Neodymium, Promethium, Samarium, Europium, Gadolinium, Terbium, Dysprosium, Holmium, Erbium, Thulium, Ytterbium, Lutetium.

8. The method of claim 1 wherein at least one of the combustion catalysts or enhancers are selected from the group consisting of fluoride, chloride, bromide, sulfate or nitrate salts or hydrates of the following elements: Cobalt, Nickel, Manganese, Iron, Copper, Molybdenum, Vanadium, Zirconium, Chromium, Aluminium, Thorium, Cadmium, Tin, Tantalum, Titanium and Carbon.

9. The method of claim 1 wherein the at least one of the combustion catalysts or enhancers comprise a noble element or compound thereof.

10. The method of claim 1 wherein combustion occurs in an internal combustion engine.

11. The method of claim 1 wherein combustion occurs in a boiler or a furnace.

12. The method of claim 1 wherein combustion occurs in a jet engine or other turbine.

13. The method of claim 1 wherein the one or more dissolved combustion catalysts or enhancers are added to an airstream supplying oxygen for the combustion process.

14. The method of claim 1 wherein the one or more dissolved combustion catalysts or enhancers are added to a combustion turbine by combination of the catalyst or enhancer with steam.

15. The method of claim 1 wherein the one or more dissolved combustion catalysts or enhancers are added to a gaseous fuel.

16. The method of claim 1 wherein combustion occurs in an engine and the ratio of air to fuel is increased in a combustion mixture when compared with operation of the engine without combustion catalyst or enhancer.

17. The method of claim 1 wherein at least one of the combustion catalysts or enhancers is potassium hexachloroplatinate (IV) or hydrogen hexachloroplatinate (IV) or a mixture thereof.

18. The method of claim 1 wherein the at least one of the combustion catalysts or enhancers is polyvinylchloride or ammonium nitrate or a mixture thereof.

19. The method of claim 1 further comprising steps of:
i) mixing one or more combustion catalysts or enhancers with water or other solvent to form a first premix;
ii) mixing the first premix with a hydrophilic/oleophilic organic compound to form a second premix;
iii) mixing the second premix with fuel or a medium compatible with fuel to form a third premix; and
mixing the third premix with liquid fuel.

20. The method according to claim 19 wherein the combustion catalyst or enhancer is present in the final fuel mixture at a concentration of less than 1 part by weight of catalyst or enhancer per 1000 million parts of fuel and greater than 1 part by weight catalyst or enhancer per 6 trillion parts of fuel.

21. The method of claim 1 further comprising steps of:
i) mixing one or more combustion catalysts or enhancers with water or other solvent to form a first premix;
ii) mixing the first premix with a hydrophilic/oleophilic organic compound to form a second premix;
iii) mixing the second premix with fuel or a medium compatible with fuel to form a third premix; and
b) mixing the third premix with liquid fuel to provide a concentration of between about 1 part by weight combustion catalyst or enhancer per 100 billion parts of fuel to about 1 part by weight of combustion catalyst or enhancer to 12 trillion parts of fuel.

22. The method of claim 21 wherein the other solvent is one or more of isopropyl alcohol, methanol, ethanol, MTBE, methylethylketone and methylisobutylketone.

23. The method of claim 22 wherein the hydrophilic/oleophilic compound is one or more of isopropyl alcohol, methanol, ethanol, MTBE, methylethylketone and methylisobutylketone.

24. The method of claim 23 wherein the medium compatible with fuel is one or more of isopropyl alcohol, methanol, ethanol, MTBE, methylethylketone and methylisobutylketone.

25. A method of claim 19 wherein mixing is performed by electric agitation means.

26. A method of claim 21 wherein mixing is performed by electric agitation means.

27. A method of claim 21 wherein one or more of the steps may be further divided into separate substeps.

* * * * *

UNITED STATES PATENT AND TRADEMARK OFFICE
CERTIFICATE OF CORRECTION

PATENT NO. : 7,503,944 B2 Page 1 of 1
APPLICATION NO. : 10/494907
DATED : March 17, 2009
INVENTOR(S) : Robert W. Carroll et al.

It is certified that error appears in the above-identified patent and that said Letters Patent is hereby corrected as shown below:

Column 13, line 48, delete "Chiorotris" and insert --Chlorotris--

Signed and Sealed this

Fourteenth Day of July, 2009

JOHN DOLL
*Acting Director of the United States Patent and Trademark Office*